(12) United States Patent
Gonnard et al.

(10) Patent No.: US 10,213,729 B2
(45) Date of Patent: Feb. 26, 2019

(54) HYDROCARBON GAS DECARBONATION METHOD

(71) Applicant: IFP Energies nouvelles, Rueil-Malmasion (FR)

(72) Inventors: Sebastien Gonnard, Grezieu la Varenne (FR); Nicolas Laloue, Lyons (FR); Agnes Leroy, Lyons (FR); Gauthier Perdu, Suresnes (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 487 days.

(21) Appl. No.: 14/898,306

(22) PCT Filed: May 19, 2014

(86) PCT No.: PCT/FR2014/051153
§ 371 (c)(1),
(2) Date: Dec. 14, 2015

(87) PCT Pub. No.: WO2014/199036
PCT Pub. Date: Dec. 18, 2014

(65) Prior Publication Data
US 2016/0144314 A1    May 26, 2016

(30) Foreign Application Priority Data

Jun. 14, 2013 (FR) ..................... 13 55593

(51) Int. Cl.
*B01D 53/14* (2006.01)
*C10L 3/10* (2006.01)
(Continued)

(52) U.S. Cl.
CPC ..... *B01D 53/1425* (2013.01); *B01D 53/1418* (2013.01); *B01D 53/1475* (2013.01);
(Continued)

(58) Field of Classification Search
CPC ...... B01D 2252/20489; B01D 53/1418; B01D 53/1425; B01D 53/1475; B01D 53/1493;
(Continued)

(56) References Cited

U.S. PATENT DOCUMENTS

| 5,820,837 | A | * | 10/1998 | Marjanovich | ............ B01D 3/06 423/220 |
| 7,637,987 | B2 | * | 12/2009 | Mak | ................... B01D 53/1425 95/160 |

(Continued)

FOREIGN PATENT DOCUMENTS

| EP | 0 107 046 A1 | 5/1984 |
| EP | 0172408 A | 2/1986 |

(Continued)

OTHER PUBLICATIONS

International Search Report for PCT/FR2014/051153 dated Oct. 7, 2015; English Translation submitted herewith (7 pages).

(Continued)

*Primary Examiner* — Cabrena Holecek
(74) *Attorney, Agent, or Firm* — Fitch, Even, Tabin & Flannery, L.L.P.

(57) ABSTRACT

Method of decarbonating a hydrocarbon gas, a natural gas for example, by washing with a solvent.
Said gas is contacted with an absorbent solution so as to obtain a $CO_2$-depleted gas and a $CO_2$-laden absorbent solution. The $CO_2$-laden absorbent solution is then heated and expanded at a predetermined pressure and temperature so as to release a hydrocarbon-containing gaseous fraction and to obtain a hydrocarbon-depleted absorbent solution, said pressure and temperature being so selected that said gaseous fraction comprises at least 50% of the hydrocarbons contained in said $CO_2$-laden absorbent solution and at most 35% of the $CO_2$ contained in said $CO_2$-laden absorbent solution. Finally, the hydrocarbon-depleted absorbent solution is thermally regenerated so as to release a $CO_2$-rich gaseous effluent and to obtain a regenerated absorbent solution.

21 Claims, 2 Drawing Sheets

(51) Int. Cl.
*E21B 43/16* (2006.01)
*E21B 43/40* (2006.01)

(52) U.S. Cl.
CPC ........ *B01D 53/1493* (2013.01); *C10L 3/101* (2013.01); *C10L 3/104* (2013.01); *E21B 43/164* (2013.01); *E21B 43/40* (2013.01); *B01D 2252/20489* (2013.01); *C10L 2290/06* (2013.01); *C10L 2290/12* (2013.01); *C10L 2290/541* (2013.01); *Y02C 10/06* (2013.01)

(58) Field of Classification Search
CPC ............ C10L 2290/06; C10L 2290/12; C10L 2290/541; C10L 3/101; C10L 3/104; E21B 43/164; E21B 43/40; Y02C 10/06
See application file for complete search history.

(56) References Cited

U.S. PATENT DOCUMENTS

| | | | |
|---|---|---|---|
| 2004/0057886 A1* | 3/2004 | Paulsen | B01D 53/1462 423/220 |
| 2004/0115109 A1 | 6/2004 | Minkkinen et al. | |
| 2009/0199713 A1* | 8/2009 | Asprion | B01D 53/1475 95/236 |
| 2010/0011958 A1 | 1/2010 | Cadours et al. | |
| 2011/0203314 A1 | 8/2011 | Mak | |
| 2013/0015406 A1 | 1/2013 | Gazarian et al. | |

FOREIGN PATENT DOCUMENTS

| | | |
|---|---|---|
| EP | 1 428 864 A1 | 6/2004 |
| FR | 2 895 273 A1 | 6/2007 |
| FR | 2 916 652 A1 | 12/2008 |
| FR | 2 956 038 A1 | 8/2011 |
| JP | S61-107920 A | 5/1986 |
| JP | 2009-537299 A | 10/2009 |
| JP | 2012-504494 A | 2/2012 |
| RU | 2385180 C1 | 3/2010 |
| SU | 1279658 A1 | 12/1986 |
| SU | 1733062 A1 | 5/1992 |

OTHER PUBLICATIONS

Office action issued by the Patent Office of Kazakhstan of Application No. 2016 / 0012.1 dated May 19, 2014 with English translation.

Office Action of JP Appln. No. 2016-518558 dated Oct. 24, 2017 with English translation.

* cited by examiner

Background

HYDROCARBON GAS DECARBONATION METHOD

FIELD OF THE INVENTION

The present invention relates to the sphere of decarbonating a hydrocarbon gas, a natural gas for example, by washing with a solvent. In particular, the invention provides a method for separating, upon regeneration, the major part of the hydrocarbons co-absorbed by the solvent from the major part of the acid gases absorbed by the solvent. The method thus allows the hydrocarbon content at the regenerator top to be controlled.

BACKGROUND OF THE INVENTION

It is well known to use thermally regenerable liquid solvents for extracting the acid compounds contained in a gas, in particular in a natural gas. Examples of the most commonly used solvents are aqueous amine solutions and some physical solvents such as sulfolane, methanol, N-formyl morpholine, acetyl morpholine, propylene carbonate.

These methods generally involve a stage of extraction of the $CO_2$ contained in the gas to be treated by contacting this gas with the regenerated solvent in an absorber operating at the pressure of the gas to be treated, followed by a thermal regeneration stage, generally at a pressure slightly above atmospheric pressure, generally between 1 and 5 bar, preferably between 1.5 and 3 bar. This thermal regeneration is generally carried out in a column equipped at the bottom with a reboiler and at the top with a condenser allowing to cool the acid compounds released by the regeneration and to recycle the condensates to the top of the regenerator as reflux.

When the pressure of the gas to be treated is notably higher than the atmospheric pressure, for example in the case of a natural gas that has to be treated at a pressure of the order of 70 bar, the acid gas-rich solvent obtained at the absorber bottom can contain significant amounts of dissolved hydrocarbons. It is then common practice to carry out a stage of release of these dissolved hydrocarbons vaporized by simple expansion of the acid gas-rich solvent. This expansion is carried out at an intermediate pressure between that of the raw gas to be treated and that of the thermal regeneration stage, typically of the order of 5 to 15 bar. A gas containing the lighter dissolved hydrocarbons, predominant in proportion by volume, which can be used as combustion gas, is thus separated from the $CO_2$-rich solvent. This gas is sometimes washed by a stream of regenerated solvent coming from the thermal stage so as to re-absorb the acid compounds released upon expansion. This washing of the gas released by expansion is generally performed in a column placed directly on the separator drum between the gas and the expanded liquid. The solvent thus laden with acid compounds is directly mixed with the expanded solvent and sent to the thermal regeneration stage.

In order to reduce the heat consumptions of these methods, a stage of thermal exchange between the rich solvent, after expansion, and the regenerated solvent obtained hot at the bottom of the regeneration column is generally carried out.

Regeneration of these solvents produces a gaseous effluent rich in acid compounds. When the raw gas contains significant amounts of heavy hydrocarbons (several hundred ppmv for example), these gases are found in significant proportions in the acid gas at the regenerator top. Indeed, although the stage of expansion of the acid gas-rich solvent obtained at the regenerator bottom allows to release the major part of the light hydrocarbons (methane, ethane, etc.) dissolved in the solvent at the absorber bottom, it does not allow to extract the major part of the heavier compounds. An acid gas that can contain several hundred ppmv hydrocarbons is thus commonly obtained at the regenerator top. The significant proportion of these compounds in the acid gas induces an increase in the VOC (Volatile Organic Compound) content and can lead to failure to meet the VOC specifications. In a vent, the VOCs are made up of the following hydrocarbon compounds: linear alkanes (methane is sometimes excluded), cyclo-alkanes, aromatics (benzene, toluene, ethyl benzene and xylenes). It is then necessary to provide an acid gas post-treatment stage such as incineration, which may involve costly equipment and high energy consumption (combustion gas consumption).

Acid gas is sometimes reinjected into the well in order to facilitate the extraction stage (EOR), notably in the case of decarbonation. It is therefore necessary to compress the water vapour-saturated acid gas. This compression requiring several stages generates water condensates. The hydrocarbons present in the acid gas are then found in these aqueous condensates, which significantly increases the cost of the associated condensate treatment required to remove the polluting hydrocarbons (notably aromatics).

To overcome these drawbacks, it is possible to adsorb the hydrocarbons present in the acid gas on a suitable material (activated charcoal for example). This method requires an additional processing unit that may be expensive as regards investment (case of a regenerable adsorbent) or operating costs (case of non-regenerable adsorbents).

The present invention provides a simple and inexpensive method that requires only a small number of additional equipments for separating, upon regeneration, the major part of the hydrocarbons co-absorbed by the solvent from the major part of the acid gases absorbed by the solvent. The method achieves this goal using a LP (Low Pressure) flash system allowing the hydrocarbon content at the regenerator top to be controlled.

The method thus allows the hydrocarbon content at the regenerator top to be controlled, which affords the following advantages:

by optimizing the pressure and temperature conditions of the LP flash system, it is possible to obtain an acid gas that can be released to the atmosphere without a post-treatment stage that is usually required to meet the environmental standards in terms of VOC content, notably in the presence of aromatic compounds, it is then possible to do without the incinerator dedicated to the destruction of the hydrocarbons present in the acid gas. Of course, an incinerator is necessary to purify the vents of the LP flash drums, but it is smaller because the flow of gas to be incinerated is much lower (5 to 15% of the acid gas flow rate), the flow of gas to be incinerated being lower, the incineration-dedicated fuel gas consumption is also significantly reduced, the flow of amine to be regenerated being slightly lower with the present invention, a gain is also achieved as regards the size of the regenerator and the feed of the reboiler, for decarbonation applications, the acid gas obtained with the present invention contains water and $CO_2$, and much less hydrocarbons. If the acid gas is to be reinjected for enhanced oil recovery purposes (EOR), the treatments usually necessary for purifying the condensates (water here) extracted from the various compression stages are greatly reduced, or even suppressed. Due to its purity, the water can in some cases be directly recycled to the amine unit with a reduced makeup water consumption, in order to meet environmental standards, the energy consumption of the method is substantially reduced due to the low combustion gas consumption according to the scheme of the present invention.

SUMMARY OF THE INVENTION

In general terms, the invention relates to a method of decarbonating a hydrocarbon gas, a natural gas for example, by washing with a solvent, wherein the following stages are carried out:

a) contacting said gas with an absorbent solution so as to obtain a $CO_2$-depleted gas and a $CO_2$-laden absorbent solution, b) heating and expanding the $CO_2$-laden absorbent solution at a predetermined pressure and temperature so as to release a hydrocarbon-containing gaseous fraction and to obtain a hydrocarbon-depleted absorbent solution, said temperature and said pressure being so selected that said gaseous fraction comprises at least 50% of the hydrocarbons contained in said $CO_2$-laden absorbent solution and at most 35% of the $CO_2$ contained in said $CO_2$-laden absorbent solution, c) thermally regenerating the hydrocarbon-depleted absorbent solution so as to release a $CO_2$-rich gaseous effluent and to obtain a regenerated absorbent solution.

According to the invention, the temperature and the pressure can be so selected that the gaseous fraction comprises at least 70% of the hydrocarbons contained in the $CO_2$-laden absorbent solution and less than 30% of the $CO_2$ contained in the $CO_2$-laden absorbent solution.

The temperature can range between the temperature of the $CO_2$-laden absorbent solution obtained after stage a) and that of the regenerated absorbent solution obtained after stage c), and the pressure can be above atmospheric pressure.

The temperature can for example range between 50° C. and 140° C., and the pressure can range between 1.5 and 6 bar.

According to the invention, at least part of the regenerated absorbent solution obtained in stage c) can be recycled to stage a) as absorbent solution.

According to one embodiment, prior to stage b), the $CO_2$-laden absorbent solution is expanded at a pressure P2 ranging between the pressure used in stage b) and a pressure used in stage a), and at a temperature substantially identical to that of the $CO_2$-laden absorbent solution obtained after stage a). Pressure P2 can range between 5 and 15 bar.

According to the invention, the absorbent solution can comprise an amine or an amine mixture in solution in water. The amine can be selected from among the group comprising primary amines, secondary amines, sterically hindered secondary amines, tertiary amines, and mixtures of tertiary amines and primary or secondary amines.

The primary amine can be selected, alone or in admixture, from among monoethanolamine (MEA), aminoethyletha-nolamine (AEEA), diglycolamine, 2-amino-2-methyl-1-propanol and the non-N-substituted derivatives thereof.

The secondary amine can be selected, alone or in admixture, from among diethanolamine (DEA), diisopropa-nolamine (DIPA), piperazine and its derivatives wherein at least one nitrogen atom is not substituted, morpholine and its non-N-substituted derivatives, piperidine and its non-N-substituted derivatives, N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol.

The tertiary amine can be selected, alone or in admixture, from among methyldiethanolamine (MDEA), trietha-nolamine (TEA), ethyldiethanolamine, diethyletha-nolamine, dimethylethanolamine, 1-methyl-4-(3-dimethyl-aminopropyl)-piperazine, 1-ethyl-4-(diethylaminoethyl), 1-methyl-4-hydroxy-piperidine, 1-methyl-2-hydroxym-ethyl-piperidine, 1,2-bis-(2-dimethylaminoethoxy)-ethane, Bis(dimethylamino-3-propyl)ether, Bis(diethylamino-3-propyl)ether, (dimethylamino-2-ethyl)-(dimethylamino-3-propyl)-ether, (diethylamino-2-ethyl)-(dimethylamino-3-propyl)-ether, (di-methylamino-2-ethyl)-(diethylamino-3-propyl)-ether, (diethylamino-2-ethyl)-(diethyl-amino-3-propyl)-ether, N-methyl-N-(3-methoxypropyl)-2-aminoethanol, N-methyl-N-(3-methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-iso-propyl-N-(3-methoxy-propyl)-2-aminoethanol, N-isopro-pyl-N-(3-methoxypropyl)-1-amino-2-propanol, N-isopro-pyl-N-(3-methoxypropyl)-1-amino-2-butanol, 1-(4-morpholino)-2-(methyliso-propylamino)-ethane, 1-(4-morpholino)-2-(methyltertio-butylamino)-ethane, 1-(4-morpholino)-2-(diisopropylamino)-ethane, 1-(4-morpholino)-2-(1-piperidinyl)-ethane and tertiobutyldiethanolamine.

The hindered secondary amine can be selected, alone or in admixture, from among N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol.

In the mixtures of tertiary amines and of primary or secondary amines, the primary or secondary amines can be selected from the group comprising Monoethanolamine, Diethanolamine, N-butylethanolamine, Aminoethyletha-nolamine, Diglycolamine, Piperazine, 1-Methylpiperazine, 2-Methylpiperazine, N-(2-hydroxyethyl)piperazine, N-(2-aminoethyl)piperazine, Morpholine, 3-(methylamino)pro-pylamine, 1,6-hexanediamine and all its diversely N-alky-lated derivatives such as, for example, N,N'-dimethyl-1,6-hexanediamine, N-methyl-1,6-hexanediamine or N,N',N'-trimethyl-1,6-hexanediamine.

The absorbent solution can be selected from the group made up of sulfolane, methanol, N-formyl morpholine, acetyl morpholine, propylene carbonate, dimethyl ether polyethylene glycol or N-methyl pyrrolidone, or an amine mixture with a physical solvent and water.

According to the invention, the gas can be a natural gas. The gas can comprise at least 50 ppmv hydrocarbons. It can comprise less than 100 ppmv $H_2S$.

Finally, the invention also relates to a method wherein the $CO_2$-rich gaseous effluent obtained at the end of stage c) is injected into an underground medium in an enhanced oil recovery process.

BRIEF DESCRIPTION OF THE FIGURES

Other features and advantages of the invention will be clear from reading the description hereafter, with reference to the accompanying figures wherein.

DETAILED DESCRIPTION

The present invention provides a simple and inexpensive method that requires only a small number of additional equipments for separating the major part of the hydrocarbons co-absorbed by the solvent from the major part of the acid gases absorbed by the solvent, and thus for controlling the hydrocarbon content at the regenerator top.

In general terms, it relates to a method of decarbonating a hydrocarbon gas, a natural gas for example, by washing with a solvent, wherein the following stages are carried out:

a) contacting said gas with an absorbent solution so as to obtain a $CO_2$-depleted gas and a $CO_2$-laden absorbent solution, b) heating and expanding the $CO_2$-laden absorbent solution at a predetermined pressure and temperature so as to release a hydrocarbon-containing gaseous fraction and to obtain a hydrocarbon-depleted absorbent solution, said temperature and said pressure being so selected that said gaseous fraction comprises at least 50% of the hydrocarbons contained in said $CO_2$-laden absorbent solution and at most 35% of the $CO_2$ contained in said $CO_2$-laden absorbent solution, the hydrocarbons being removed from the concentrated phase by means of a dedicated incineration stage, c) thermally regenerating the hydrocarbon-depleted absorbent solution so as to release a $CO_2$-rich gaseous effluent and to obtain a regenerated absorbent solution. Thermal regeneration can be achieved by distillation or by entrainment of the acid compounds by a vapour stream, an operation commonly referred to as stripping.

According to an embodiment, at least part of the regenerated absorbent solution obtained in stage c) is recycled to stage a) as absorbent solution.

In stage b), the absorbent solution is preferably heated by exchange with a fluid of the process through a heat exchanger, but any other heating means allowing a suitable temperature to be obtained can be used. The absorbent solution thus heated undergoes expansion at a predetermined pressure and temperature so as to release a gaseous fraction predominantly comprising hydrocarbons and to obtain a hydrocarbon-depleted absorbent solution. The pressure and temperature conditions are optimized so that the gaseous fraction comprises at least 50% of the hydrocarbons contained in the acid gas-laden absorbent solution and at most 35% of the acid gas contained in the acid gas-laden absorbent solution.

Figure 2:
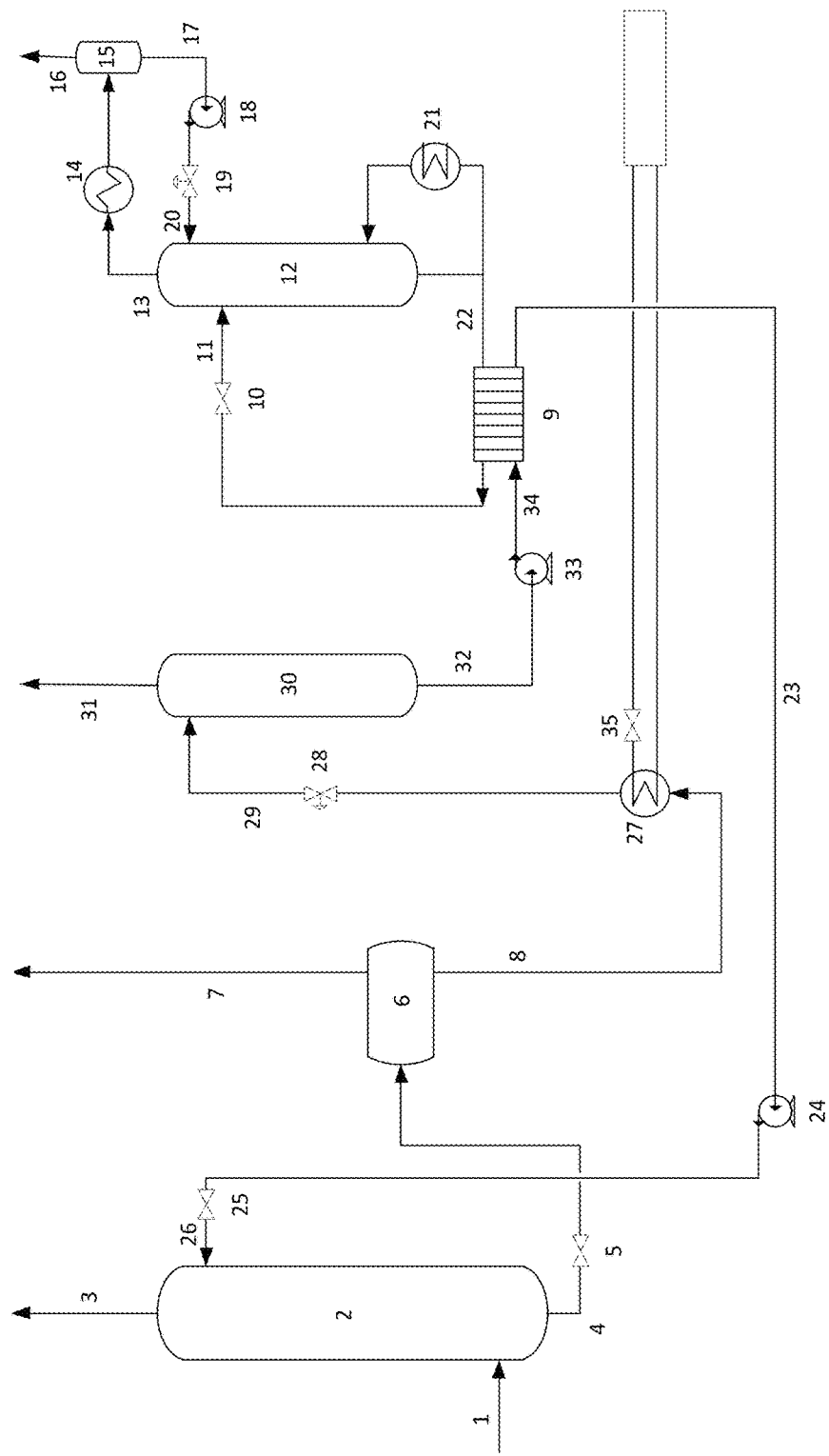

In connection with FIG. 2, the gas to be treated flows in through line 1 at the bottom of an absorber 2. The gas from which the acid gases absorbed by the solvent injected at the absorber top through line 26 and the fractions of the co-absorbed compounds, notably hydrocarbons, are extracted is recovered at the top of absorber 2. This absorber generally operates at temperatures close to or slightly higher than the ambient temperature, typically ranging between 20° C. and 100° C., preferably between 30° C. and 90° C., and at pressures typically ranging between 10 and 200 bar, preferably between 20 and 100 bar.

The gas flowing in through line 1 can be a natural gas available at a pressure ranging between 10 and 200 bar, and at a temperature ranging between 20° C. and 100° C. This gas comprises $CO_2$, and possibly other acid compounds such as $H_2S$, COS, mercaptans and hydrocarbons.

The acid gas-rich solvent obtained at the bottom of the absorber through line 4 is expanded by an expansion means 5 and fed into a first flash drum 6. This first expansion stage is optional for implementing the method according to the invention, but it allows to obtain, through line 7, a gas containing the major part of the light hydrocarbons co-absorbed by the solvent. This gas is possibly washed by a fraction of the regenerated solvent and the gas thus obtained can be used as fuel gas. This washing procedure, which is optional, is however not shown here. Flash drum 6 operates at a pressure P2 below that of absorber 2 and above that of flash drum 30. This pressure generally depends on the conditions of use of the fuel gas and it is typically of the order of 5 to 15 bar. This drum operates at a temperature that is substantially identical to that of the solvent obtained at the bottom of absorber 2.

The acid gas-rich solvent obtained after expansion is sent through line 8 to a preheating means. FIG. 2 shows a heat exchanger 27 with a hot utility, but any other suitable means of preheating through exchange with available fluids can be used, provided that it allows the temperature of the acid gas-rich solvent to be brought to the level required for partial vaporization of the compounds absorbed by the solvent.

The preheated acid gas-rich solvent is fed through line 29, possibly after expansion by means of an expansion means 28, into drum 30 where the vaporized gases and the acid gas-rich solvent are separated. This drum 30 is operated under such pressure and temperature conditions that vaporization of a minor fraction of the acid gases absorbed by the solvent, generally below 35%, preferably below 30%, and of a major fraction of the hydrocarbons absorbed by the solvent, above 50%, preferably above 70%, is obtained. The pressure of drum 30 is lower than that of drum 6 and higher than the atmospheric pressure, preferably ranging between 1.5 and 6 bar. The temperature of drum 30 ranges between that of the acid gas-laden solvent obtained at the bottom of absorber 2 and that of the regenerated solvent obtained at the bottom of regenerator 12. This temperature can range between 50° C. and 140° C.

The solvent obtained at the bottom of drum 30 is sent through line 32, pump 33 and line 34 to a preheating means. FIG. 2 shows a heat exchanger 9 with the regenerated solvent obtained at the bottom of regeneration column 12, but any other suitable preheating means can be used. The acid gas-rich solvent thus preheated is fed through line 11, possibly after expansion through an expansion means 10, at the top of regenerator 12. In this regenerator, the acid gases absorbed by the solvent, notably $CO_2$, are vaporized by an effect commonly referred to as stripping with vapour generated by reboiler 21 at the regenerator bottom. These gases are collected through line 13 at the regenerator top, cooled in exchanger 14, and the water and the solvent contained in the regenerator top gas are mainly condensed, separated in reflux drum 15 and recycled as reflux to the regenerator top through line 20. The operating pressure and temperature conditions of the regenerator depend on the solvent type used. Regenerator 12 operates at a pressure generally ranging between atmospheric pressure and 10 bar, preferably between 1.05 and 3 bar. The temperature at the bottom of the regenerator generally ranges between 100° C. and 200° C., preferably between 110° C. and 150° C.

At the bottom of regenerator 12, a stream of hot regenerated solvent is obtained through line 22 and recycled via line 23, pump 24 and line 26 to the top of absorber 2 after heat exchange with the acid gas-rich solvent in exchanger 9.

The gases released by partial vaporization in drum 30 are sent through line 31 to a dedicated incinerator. The acid gases separated in drum 15 are fed into line 16 and they can be either discharged or sent to a compression train for EOR.

The Absorbent Solution

The absorbent solution comprises an amine or an amine mixture in solution in water. The amine can be selected from among the group comprising primary amines, secondary amines, sterically hindered secondary amines, tertiary amines, and mixtures of tertiary amines and primary or secondary amines.

The primary amines can be selected, alone or in admixture, from among monoethanolamine (MEA), aminoethylethanolamine (AEEA), diglycolamine, 2-amino-2-methyl-1-propanol and the non-N-substituted derivatives thereof.

The secondary amines can be selected, alone or in admixture, from among diethanolamine (DEA), diisopropanolamine (DIPA), piperazine and its derivatives wherein at least one nitrogen atom is not substituted, morpholine and its non-N-substituted derivatives, piperidine and its non-N-substituted derivatives, N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol.

The tertiary amines can be selected, alone or in admixture, from among methyldiethanolamine (MDEA), triethanolamine (TEA), ethyldiethanolamine, diethylethanolamine, dimethylethanolamine, 1-methyl-4-(3-dimethylaminopropyl)-piperazine, 1-ethyl-4-(diethylaminoethyl), 1-methyl-4-hydroxy-piperidine, 1-methyl-2-hydroxymethyl-piperidine, 1,2-bis-(2-dimethylaminoethoxy)-ethane, Bis(dimethylamino-3-propyl)ether, Bis(diethylamino-3-propyl)ether, (dimethylamino-2-ethyl)-(dimethyl-amino-3-propyl)-ether, (diethylamino-2-ethyl)-(dimethylamino-3-propyl)-ether, (di-methylamino-2-ethyl)-(diethylamino-3-propyl)-ether, (diethylamino-2-ethyl)-(diethyl-amino-3-propyl)-ether, N-methyl-N-(3-methoxypropyl)-2-aminoethanol, N-methyl-N-(3-methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-isopropyl-N-(3-methoxy-propyl)-2-aminoethanol, N-isopropyl-N-(3-methoxypropyl)-1-amino-2-propanol, N-isopropyl-N-(3-methoxypropyl)-1-amino-2-butanol, 1-(4-morpholino)-2-(methyliso-propylamino)-ethane, 1-(4-morpholino)-2-(methyltertio-butylamino)-ethane, 1-(4-morpholino)-2-(diisopropylamino)-ethane, 1-(4-morpholino)-2-(1-piperidinyl)-ethane and tertiobutyldiethanolamine.

The hindered secondary amines can be selected, alone or in admixture, from among N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol.

In the mixtures of tertiary amines and of primary or secondary amines, the primary or secondary amines (activators) can be selected from the group comprising Monoethanolamine, Diethanolamine, N-butylethanolamine, Aminoethylethanolamine, Diglycolamine, Piperazine, 1-Methylpiperazine, 2-Methylpiperazine, N-(2-hydroxyethyl)piperazine, N-(2-aminoethyl)piperazine, Morpholine, 3-(methyl-amino)propylamine, 1,6-hexanediamine and all its diversely N-alkylated derivatives such as, for example, N,N'-dimethyl-1,6-hexanediamine, N-methyl-1,6-hexanediamine or N,N',N'-trimethyl-1,6-hexanediamine.

Finally, the absorbent solution can be selected from the group made up of sulfolane, methanol, N-formyl morpholine, acetyl morpholine, propylene carbonate, dimethyl ether polyethylene glycol or N-methyl pyrrolidone, or an amine mixture with a physical solvent and water.

EXAMPLES

The examples given hereafter illustrate the operation and the advantages of the method according to the invention. The first example is given by way of comparison and illustrates a method according to the prior art. The second example illustrates the operation of the method according to the embodiment of the invention. Finally, the third example allows to illustrate the performance of the present invention for treating gases with higher aromatic compound contents (BTX).

In Examples 1 and 2, 8.3 MMSm$^3$/d of a natural gas whose composition is given in Table 1 are to be treated. The standard conditions are 15° C. and 1 atm. In the rest of the document, the term HC designates all of the hydrocarbon cuts starting from methane ($C_1$) and comprising also aromatics. For these examples, two case studies are presented:

the case Max $CO_2$ corresponding to the maximum $CO_2$ content of the gas to be treated, the case Max HC corresponding to a gas depleted in $CO_2$ but rich in heavy HC.

TABLE 1

Composition of the raw gas to be treated

| Raw gas | Case Max $CO_2$ dry mol % | Case Max HC dry mol % |
|---|---|---|
| $CO_2$ | 5.0484 | 2.3932 |
| $H_2S$ | 0.0005 | 0.0005 |
| $N_2$ | 0.3405 | 0.4935 |
| $C_1$ | 93.1154 | 92.6 |
| $C_2$ | 1.2419 | 3.3586 |
| $C_3$ | 0.2107 | 0.6955 |
| $C_4$ | 0.0335 | 0.2164 |
| $C_5$ | 0.0058 | 0.0879 |
| $C_{6+}$ Excl. aromatics | 0.0027 | 0.1496 |
| Benzene | 0.0003 | 0.0019 |
| Toluene | 0.0001 | 0.0011 |
| Xylenes | 0.0002 | 0.0018 |

$C_6^+$ designates all the $C_6$ to $C_{12}$ aliphatic cuts.

This gas is fed to the absorber at a temperature of 52° C. and at a pressure of 68.5 bar in order to be contacted with an HEP-activated (80 g/l) aqueous MDEA solution (397 g/l). The solvent is fed to the absorption column at a temperature of 60° C. and at a flow rate of 290 Sm$^3$/h for case Max $CO_2$ and 145 Sm$^3$/h for case Max HC. The absorption column is equipped with structured packings. The height of the absorption zone has been optimized so as to meet the specifications relative to the treated gas.

The required specifications are as follows:
2 mol % $CO_2$ (1.8% calculated) in the treated gas
1.45 ppm $H_2S$ in the treated gas
150 mg/Nm$^3$ VOC in the treated gas.

After treatment, the natural gas flows out at a rate of 8 MMSm$^3$/d with the composition given in Table 2.

TABLE 2

Composition of the treated gas

| Treated gas | Case Max $CO_2$ dry mol % | Case Max HC dry mol % |
|---|---|---|
| $CO_2$ | 1.8092 | 0.6367 |
| $H_2S$ | 0 | 0 |
| $N_2$ | 0.3525 | 0.5026 |
| $C_1$ | 96.2925 | 94.2672 |
| $C_2$ | 1.284 | 3.4188 |

TABLE 2-continued

Composition of the treated gas

| Treated gas | Case Max $CO_2$ dry mol % | Case Max HC dry mol % |
|---|---|---|
| $C_3$ | 0.2179 | 0.708 |
| $C_4$ | 0.0347 | 0.2202 |
| $C_5$ | 0.0059 | 0.0896 |
| $C_6+$ Excl. aromatics | 0.0027 | 0.1521 |
| Benzene | 0.0003 | 0.0019 |
| Toluene | 0.0001 | 0.0011 |
| Xylenes | 0.0002 | 0.0018 |

1.1—Example 1: Method According to the Prior Art

Figure 1:
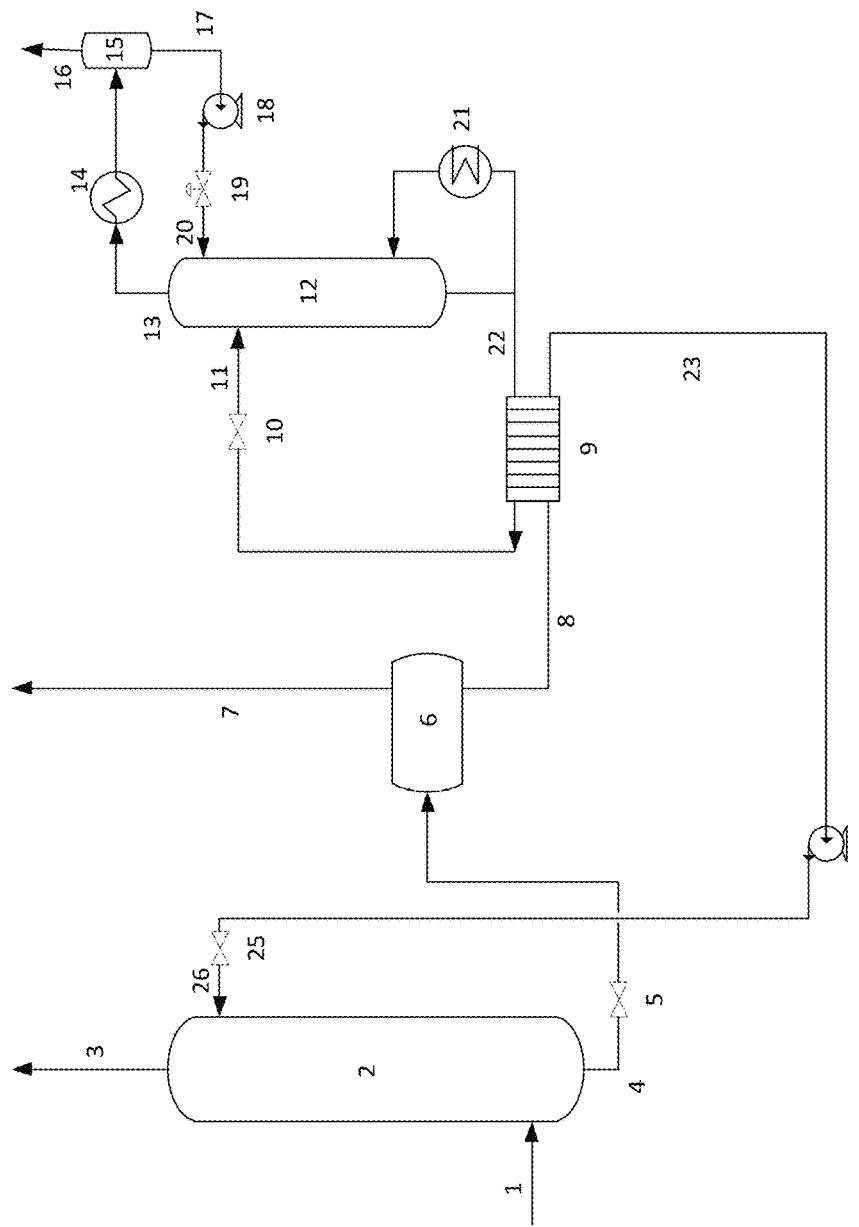
FIG. 1 diagrammatically shows an embodiment of the method according to the prior art, and FIG. 2 diagrammatically shows an embodiment of the method according to the invention.

In this example, the scheme selected is illustrated in FIG. 1. It does not contain the device for controlling the HO content of the acid gas.

With this method, the composition of the acid gas obtained at the regenerator top is given in Table 3.

TABLE 3

Composition of the acid gas obtained with a method according to the prior art

| Treated gas | Case Max $CO_2$ dry mol % | Case Max HC dry mol % |
|---|---|---|
| $CO_2$ | 99.69 | 99.66 |

| | dry ppmv | |
|---|---|---|
| $H_2S$ | 151 | 282 |
| $N_2$ | 3.5 | 4.6 |
| $C_1$ | 2793 | 2784 |
| $C_2$ | 51 | 138 |
| $C_3$ | 6 | 21 |
| $C_4$ | 3.5 | 6 |
| $C_5$ | 1 | 1 |
| $C_6+$ Excl. aromatics | 4 | 63 |
| Cycloalkanes | 0 | 3 |
| Benzene | 3.5 | 4 |
| Toluene | 1 | 17 |
| Ethyl Benzene | 1 | 25 |
| Xylenes | 2 | 19 |

The VOC contents of the acid gas are as follows:
case Max $CO_2$: 1600 mg/Nm$^3$
case Max HC: 3100 mg/Nm$^3$ In both cases, since the VOC specification in the acid gas is not met, it is necessary to use an incinerator dedicated to the acid gas. In this case, the dimensions of the incinerator, of vertical natural draft type, are: Combustion chamber diameter: 3500 mm, Combustion chamber height: 12000 mm, Chimney height: 45 meters.

The fuel gas consumption dedicated to the acid gas incineration is estimated at 726 kg/h.

1.2—Example 2: Method According to the Invention

The invention consists in using a low-pressure column that, after gentle preheating, allows the rich amine to be expanded so as to evaporate the HC (the VOC for example) dissolved in the solvent while controlling the $CO_2$ loss and the size of the downstream regenerator. The flash gas thus obtained is incinerated in a dedicated incinerator. In this example, the LP flash column operates under the following conditions:

Temperature 75° C. at 1.5 bar for the case Max $CO_2$
Temperature 77° C. at 1.5 bar for the case Max HC.

The additional equipments illustrated in FIG. 2 are as follows:
Exchanger 9 for preheating the rich amine (4.5 MW)
LP flash column 12 (diameter 3 m, height 10.8 m including a 2-m packing bed)
Circulating pump 15 (hydraulic power=52 kW)
LP flash gas incinerator (vertical natural draft, combustion chamber diameter 1500 mm, combustion chamber height 3000 m, chimney 35 m).

One could have done without MP flash drum 6.

With this method, the composition of the acid gas obtained at the regenerator top is given in Table 4.

TABLE 4

Composition of the acid gas obtained with a method according to the present invention

| Treated gas | Case Max $CO_2$ dry mol % | Case Max HC dry mol % |
|---|---|---|
| $CO_2$ | 99.9809 | 99.9677 |

| | dry ppmv | dry ppmv |
|---|---|---|
| $H_2S$ | 155 | 298 |
| $N_2$ | 0 | 0 |
| $C_1$ | 32 | 12 |
| $C_2$ | 1 | 1 |
| $C_3$ | 0 | 0 |
| $C_4$ | 0 | 0 |
| $C_5$ | 0 | 0 |
| $C_6+$ excl. aromatics | 1 | 1 |
| Cycloalkanes | 0 | 0 |
| Benzene | 1 | 6 |
| Toluene | 1 | 3 |
| Ethyl Benzene | 1 | 4 |
| Xylenes | 0 | 2 |

The VOC contents of the acid gas are as follows:
case Max $CO_2$: 30 mg/Nm$^3$
case Max HC: 60 mg/Nm$^3$ In both cases, since the VOC specification in the acid gas is met, it is no longer necessary to use an incinerator dedicated to the acid gas.

In case of compression and cooling of the compressed acid gas, the water condensed in this stage is notably less polluted by liquid hydrocarbons than in the method according to the prior art. It is then possible to recycle this water without liquid HC purification treatment.

For this case, the fuel gas consumption dedicated to LP incineration is estimated at 15 kg/h.

1.3—Example 3: Case of a Gas with a High Aromatics Content

This example compares the VOC contents of an acid gas obtained after treatment of a BTX-rich raw gas with:
the method according to the prior art illustrated in FIG. 1
the method according to the present invention described in FIG. 2.

In this example, only the VOC contents of the acid gas and the incineration-dedicated fuel gas consumptions are compared.

For the method according to the invention, the LP flash column operates at 87° C. and 1.5 bar.

76 t/h of a raw gas containing 3% $CO_2$, 14 ppm $H_2S$ and 318 ppmv BTX are to be treated. The composition of this gas is given in Table 5.

TABLE 5

Composition of the feed gas

| STREAM NAME | Feed gas |
|---|---|
| PRESSURE (bar) | 64.1 |
| TEMPERATURE (deg. C.) | 36.82 |
| Composition (dry mol %) | |
| CARBON DIOXIDE | 3.0409 |
| HYDROGEN SULFIDE | 0.0014 |
| $H_2O$ | |
| $N_2$ | 0.8052 |
| $H_2$ | 0.018 |
| METHANE | 90.8092 |
| ETHANE | 4.1082 |
| PROPANE | 0.7592 |
| ISOBUTANE | 0.127 |
| N-BUTANE | 0.129 |
| ISOPENTANE | 0.058 |
| N-PENTANE | 0.026 |
| N-HEXANE | 0.0578 |
| N-HEPTANE | 0.024 |
| N-OCTANE | 0.0029 |
| N-NONANE | 0.0011 |
| BENZENE | 0.03 |
| TOLUENE | 0.0013 |
| ETHYL-BENZENE | 0.0005 |
| Total HC excl. BTX | 96.1024 |
| Total BTX | 0.0318 |
| Total HC | 96.1342 |

This gas is fed to the absorber at a temperature of 35.7° C. and at a pressure of 64.1 bar in order to be contacted with an HEP-activated (80 g/l) aqueous MDEA solution (397 g/l). The solvent is fed to the absorption column at a temperature of 44.5° C. and at a flow rate of 78 Sm³/h. The absorption column is equipped with a tray section and a structured packing section. The height and the layout of the absorption zone have been optimized so as to meet the specifications relative to the treated gas (50 ppmv $CO_2$ and 3 ppmv $H_2S$). The composition of the treated gas is given in Table 6.

TABLE 6

Composition of the treated gas

| STREAM NAME | TREATED GAS |
|---|---|
| PRESSURE (bar) | 63.2 |
| TEMPERATURE (deg. C.) | 37.93 |
| Composition (mol %) | |
| CARBON DIOXIDE | 0.0014 |
| HYDROGEN SULFIDE | |
| $H_2O$ | 0.1396 |
| $N_2$ | 0.8297 |
| $H_2$ | 0.0186 |
| METHANE | 93.5285 |
| ETHANE | 4.2307 |
| PROPANE | 0.782 |
| ISOBUTANE | 0.1309 |
| N-BUTANE | 0.1329 |
| ISOPENTANE | 0.0598 |
| N-PENTANE | 0.0268 |
| N-HEXANE | 0.0595 |
| N-HEPTANE | 0.0247 |
| N-OCTANE | 0.003 |
| N-NONANE | 0.0011 |
| BENZENE | 0.0292 |
| TOLUENE | 0.0013 |
| ETHYL-BENZENE | 0.0005 |
| Total HC excl. BTX | 98.9799 |
| Total BTX | 0.031 |
| Total HC | 99.0109 |

The acid gas-laden amine obtained in the absorber bottom at a temperature of 60° C. is then expanded in a MP (Medium Pressure) flash drum at 7.3 bar so as to evaporate part of the light HC to make up fuel gas. According to the prior art, the rich amine, once expanded, is preheated by the regenerated amine prior to being sent to the regenerator in order to obtain an acid gas-poor solvent and a gas referred to as acid gas at the top, essentially containing $CO_2$, $H_2S$ and a hydrocarbon fraction. According to the invention, the expanded rich amine is preheated, then expanded again (LP flash) at low pressure (1.5 bar here) prior to flowing through the amine/amine exchanger and being regenerated. This additional stage allows to evaporate an additional heavier hydrocarbon fraction containing notably aromatic compounds. The compositions of the acid gases and of the LP flash gas are given in Table 7 hereafter. This table also shows the evolution of the flow rates and of the VOC contents of these gases according to the type of method used. These values allow to determine whether it is necessary to incinerate the acid gas and, if so, the associated fuel gas consumption.

TABLE 7

Composition of the acid gas and of the flash gas according to the method considered

| | METHOD | | |
|---|---|---|---|
| | Prior art | According to the invention | |
| STREAM NAME | Acid gas to Incinerator | LP gas to Incinerator | Acid gas to vent |
| PRESSURE (bar) | 1.2 | 1.2 | 1.2 |
| TEMPERATURE (deg. C.) | 36.66 | 87.11 | 36.66 |
| Composition (mol %) | | | |
| CARBON DIOXIDE | 95.5907 | 62.642 | 95.8987 |
| HYDROGEN SULFIDE | 0.044 | 0.0281 | 0.0445 |
| $H_2O$ | 4.051 | 36.5875 | 4.051 |
| $N_2$ | 0.0007 | 0.0016 | |
| $H_2$ | | | |
| METHANE | 0.245 | 0.5855 | 0.0005 |
| ETHANE | 0.0152 | 0.0363 | |
| PROPANE | 0.002 | 0.0048 | |
| ISOBUTANE | 0.0003 | 0.0007 | |
| N-BUTANE | 0.0003 | 0.0008 | |
| ISOPENTANE | 0.0001 | 0.0002 | |
| N-PENTANE | | 0.0001 | |
| N-HEXANE | 0.0003 | 0.0008 | |
| N-HEPTANE | 0.0003 | 0.0007 | |
| N-OCTANE | 0.0001 | 0.0002 | |
| N-NONANE | 0.0001 | 0.0002 | |

TABLE 7-continued

Composition of the acid gas and of the flash gas according to the method considered

| | METHOD | | |
|---|---|---|---|
| | Prior art | According to the invention | |
| STREAM NAME | Acid gas to Incinerator | LP gas to Incinerator | Acid gas to vent |
| BENZENE | 0.0474 | 0.105 | 0.0049 |
| TOLUENE | 0.0019 | 0.0042 | 0.0002 |
| ETHYL-BENZENE | 0.0007 | 0.0015 | 0.0001 |
| Total HC excl. BTX | 0.2637 | 0.6303 | 0.0005 |
| Total BTX | 0.05 | 0.1107 | 0.0052 |
| Total HC | 0.3137 | 0.741 | 0.0057 |
| Vol. flow rate (Nm3/h) | 3165 | 1252 | 2167 |
| VOC content (mg/Nm3) | 3627.3 | 8846.7 | 187 |
| BTX content (mg/Nm3) | 1675.3 | 3923.8 | 183.1 |

For the method according to the present invention, it is not necessary to incinerate the acid gas as a result of the 95% gain on the VOC content and notably the 89% gain on the aromatic compounds content.

In both cases, it is however necessary to provide an incinerator:

to incinerate the acid gas in the case of the method according to the prior art to incinerate the LP flash gas in the case of the present invention.

This incinerator is however bulkier and costlier in the case of the method according to the prior art because the gas flow to be incinerated is greater (by 59%). The cost of the incinerators has not been estimated but the fuel gas consumption has been assessed to illustrate the gain achieved by implementing the present invention.

According to the prior art, incineration of the acid gas consumes around 186 kg/h fuel gas against 28 kg/h for incineration of the LP flash gas in the case of the present invention, i.e. a 85% gain.

It can be noted that the water recoverable from the acid gas, if it is condensed after an acid gas compression stage, contains markedly less hydrocarbons.

Use

According to the invention, the gas can be a natural gas, a gas comprising at least 50 ppmv hydrocarbons and/or a gas comprising less than 100 ppmv $H_2S$.

The hydrocarbon-containing gaseous fraction obtained in stage b) can be sent to a treating unit other than an incinerator, the combustion gas network for example.

The invention also relates to an enhanced oil recovery (EOR) method wherein the $CO_2$-rich gaseous effluent obtained at the end of stage c) is injected into an underground medium. This injection can be performed via a well so as to facilitate the hydrocarbon extraction stage.

The invention claimed is:

1. A method of decarbonating a hydrocarbon gas by washing with an absorbent solution, wherein the following stages are carried out:
   a) contacting the gas with the absorbent solution so as to obtain a $CO_2$-depleted gas and a $CO_2$-laden absorbent solution,
   b') expanding the $CO_2$-laden absorbent solution to obtain a gas containing a major part of light hydrocarbons co-absorbed by the absorbent solution,
   b) heating and expanding the expanded $CO_2$-laden absorbent solution from step b') at a predetermined pressure and temperature so as to release a hydrocarbon-containing gaseous fraction and to obtain a hydrocarbon-depleted absorbent solution, the temperature and the pressure providing the gaseous fraction comprising at least 50% of the hydrocarbons contained in the $CO_2$-laden absorbent solution and at most 35% of the $CO_2$ contained in the $CO_2$-laden absorbent solution,
   c) thermally regenerating the hydrocarbon-depleted absorbent solution by stripping or distillation so as to release a $CO_2$-rich gaseous effluent and to obtain a regenerated absorbent solution.

2. The method as claimed in claim 1, wherein the pressure and the temperature provide the gaseous fraction comprising at least 70% of the hydrocarbons contained in the $CO_2$-laden absorbent solution and less than 30% of the $CO_2$ contained in the $CO_2$-laden absorbent solution.

3. The method as claimed in claim 1, further comprising recycling at least part of the regenerated absorbent solution obtained in stage c) as absorbent solution to stage a).

4. The method as claimed in claim 1, wherein the absorbent solution comprises at least one selected from the group consisting of sulfolane, methanol, N-formyl morpholine, acetyl morpholine, propylene carbonate, dimethyl ether polyethylene glycol, N-methyl pyrrolidone, and an amine mixture with a physical solvent and water.

5. The method as claimed in claim 1, wherein the hydrocarbon gas is a natural gas.

6. The method as claimed in claim 1, wherein the hydrocarbon gas comprises at least 50 ppmv hydrocarbons.

7. The method as claimed in claim 1, wherein the hydrocarbon gas comprises less than 100 ppmv $H_2S$.

8. The method as claimed in claim 1, further comprising injecting the $CO_2$-rich gaseous effluent obtained at the end of stage c) into an underground medium in an enhanced oil recovery process.

9. The method as claimed in claim 1, wherein the predetermined temperature ranges between a temperature of the $CO_2$-laden absorbent solution obtained after stage a) and that of the regenerated absorbent solution obtained after stage c), and the predetermined pressure is above atmospheric pressure.

10. The method as claimed in claim 9, wherein the predetermined temperature ranges between 50° C. and 140° C., and the predetermined pressure ranges between 1.5 and 6 bar.

11. The method as claimed in claim 1, wherein stage b') further comprises expanding the $CO_2$-laden absorbent solution at a pressure P2 ranging between the pressure used in stage b) and a pressure used in stage a), and at a temperature substantially identical to that of the $CO_2$-laden absorbent solution obtained after stage a).

12. The method as claimed in claim 11, wherein the pressure P2 ranges between 5 and 15 bar.

13. The method as claimed in claim 1, wherein the absorbent solution comprises an amine or an amine mixture in solution in water.

14. The method as claimed in claim 13, wherein the amine includes at least one selected from the group consisting of a primary amine, a secondary amine, a tertiary amine, and a mixture of a tertiary amine and a primary or a secondary amine.

15. The method as claimed in claim 14, wherein the primary amine is selected, alone or in admixture, from among monoethanolamine (MEA), aminoethyl-ethanolamine (AEEA), diglycolamine, 2-amino-2-methyl-1-propanol and the non-N-substituted derivatives thereof.

16. The method as claimed in claim 14, wherein the secondary amine is selected, alone or in admixture, from among diethanolamine (DEA), diisopropanolamine (DIPA), piperazine and its derivatives wherein at least one nitrogen atom is not substituted, morpholine and its non-N-substituted derivatives, piperidine and its non-N-substituted derivatives, N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol.

17. The method as claimed in claim 14, wherein the tertiary amine is selected, alone or in admixture, from among methyldiethanolamine (MDEA), triethanolamine (TEA), ethyldiethanolamine, diethylethanolamine, dimethylethanolamine, 1-methyl-4-(3-dimethylaminopropyl)-piperazine, 1-ethyl-4-(diethylaminoethyl), 1-methyl-4-hydroxy-piperidine, 1-methyl-2-hydroxymethyl-piperidine, 1,2-bis-(2-dimethyl-amino-ethoxy)-ethane, Bis(dimethyl-amino-3-propyl)ether, Bis(diethylamino-3-propyl)ether, (di-methylamino-2-ethyl)-(dimethyl-amino-3-propyl)-ether, (diethylamino-2-ethyl)-(dimethylamino-3-propyl)-ether, (di-methylamino-2-ethyl)-(diethylamino-3-propyl)-ether, (diethylamino-2-ethyl)-(diethyl-amino-3-propyl)-ether, N-methyl-N-(3-methoxypropyl)-2-aminoethanol, N-methyl-N-(3-methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-isopropyl-N-(3-methoxy-propyl)-2-aminoethanol, N-isopropyl-N-(3-methoxy-propyl)-1-amino-2-propanol, N-isopropyl-N-(3-methoxypropyl)-1-amino-2-butanol, 1-(4 morpholino)-2-(methylisopropylamino)-ethane, 1-(4 morpholino)-2-(methyltertbutylamino)-ethane, 1-(4-morpholino)-2-(diisopropylamino)-ethane, 1-(4-morpholino)-2-(1-piperidinyl)-ethane and tertbutyldiethanolamine.

18. The method as claimed in claim 14 wherein, in the mixture of the tertiary amine and the primary or the secondary amine, the primary or the secondary amine includes at least one selected from the group consisting of Monoethanolamine, Diethanolamine, N-butyl-ethanolamine, Aminoethylethanolamine, Diglycolamine, Piperazine, 1-Methylpiperazine, 2-Methylpiperazine, N-(2-hydroxyethyl)piperazine, N-(2-aminoethyl)piperazine, Morpholine, 3-(methylamino)propylamine, 1,6-hexanediamine and N-alkylated derivatives.

19. The method as claimed in claim 18, wherein the N-alkylated derivatives of 1,6-hexanediamine include at least one selected from the group consisting of N,N'-dimethyl-1,6-hexanediamine, N-methyl-1,6-hexanediamine or N,N',N'-trimethyl-1,6-hexanediamine.

20. The method as claimed in claim 14, wherein the secondary amine comprises a sterically hindered secondary amine.

21. The method as claimed in claim 20, wherein the hindered secondary amine is selected, alone or in admixture, from among N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol.

* * * * *